US009390189B2

(12) United States Patent
Wang et al.

(10) Patent No.: US 9,390,189 B2
(45) Date of Patent: *Jul. 12, 2016

(54) METHOD AND SYSTEM FOR PROVIDING OBJECT INFORMATION ON THE INTERNET (71) Applicant: Alibaba Group Holding Limited, George Town (KY)

(72) Inventors: Ping Wang, Hangzhou (CN); Xu Qiang Yue, Hangzhou (CN); Chen Zhu, Hangzhou (CN); Gan Wu, Hangzhou (CN); Wei Wen Hua, Hangzhou (CN); Jia Wang, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/521,052

(22) Filed: Oct. 22, 2014

(65) Prior Publication Data
US 2015/0142814 A1 May 21, 2015

Related U.S. Application Data (63) Continuation of application No. 12/462,084, filed on Jul. 29, 2009, now Pat. No. 8,903,821.

(30) Foreign Application Priority Data

Aug. 28, 2008 (CN) .......................... 2008 1 0147546

(51) Int. Cl.
*G06F 7/00* (2006.01)
*G06F 17/30* (2006.01)
(Continued)

(52) U.S. Cl.
CPC ...... *G06F 17/3089* (2013.01); *G06F 17/30864* (2013.01); *G06Q 30/02* (2013.01); *G06Q 30/0603* (2013.01)

(58) Field of Classification Search
CPC .......... G06F 17/30058; G06F 17/3056; G06F 17/30861; G06F 17/30943
USPC ............ 707/999.001, 999.102, E17.107, 758, 707/736, E17.055, 769, 999.104; 705/27.1, 705/26.1
See application file for complete search history.

(56) References Cited

U.S. PATENT DOCUMENTS 5,787,412 A 7/1998 Bosch et al.
5,941,947 A 8/1999 Brown et al.
(Continued)

FOREIGN PATENT DOCUMENTS

CN 1920831 A 2/2007
CN 101174263 A 5/2008
(Continued)

*Primary Examiner* — Usmaan Saeed
*Assistant Examiner* — Cecile Vo
(74) *Attorney, Agent, or Firm* — Van Pelt, Yi & James LLP (57) ABSTRACT Providing object information on the Internet includes configuring a plurality of front-end categories for a plurality of network objects and a plurality of screening conditions for screening the plurality of network objects, where each of the plurality of screening conditions uniquely corresponding to a respective one of the plurality of the front-end categories. Providing object information further includes receiving object information pertaining to a network object, the object information including a screening condition for the network object; storing the object information in a back-end category, determining a front-end category to which the network object belongs, according to the screening condition and storing correlation information of the object and the front-end category, wherein the back-end category is separate from and different than the front-end category.

17 Claims, 3 Drawing Sheets (51) Int. Cl.
*G06Q 30/02* (2012.01)
*G06Q 30/06* (2012.01)
*G06F 13/14* (2006.01)

(56) References Cited

U.S. PATENT DOCUMENTS

| | | |
|---|---|---|
| 5,966,509 A | 10/1999 | Abe et al. |
| 5,987,423 A | 11/1999 | Arnold et al. |
| 6,076,106 A | 6/2000 | Hamner et al. |
| 6,363,421 B2 | 3/2002 | Barker et al. |
| 6,573,908 B1 | 6/2003 | Jang |
| 6,643,652 B2 | 11/2003 | Helgeson et al. |
| 7,107,226 B1 | 9/2006 | Cassidy et al. |
| 7,428,530 B2 * | 9/2008 | Ramarathnam ... G06F 17/30864 |
| 2007/0230529 A1 | 10/2007 | Mochizuki |
| 2007/0260529 A1 * | 11/2007 | Furuno ................. G06Q 30/06 705/26.8 |
| 2008/0162400 A1 | 7/2008 | O'Malley |
| 2010/0057677 A1 | 3/2010 | Rapp et al. |

FOREIGN PATENT DOCUMENTS

| | | |
|---|---|---|
| CN | 101231638 A | 7/2008 |
| JP | 2002259401 A | 9/2002 |
| JP | 2002297620 A | 10/2002 |
| JP | 2005107937 A | 4/2005 |
| JP | 2007188440 A | 7/2007 |

* cited by examiner

METHOD AND SYSTEM FOR PROVIDING OBJECT INFORMATION ON THE INTERNET

CROSS REFERENCE TO OTHER APPLICATIONS

This application is a continuation of co-pending U.S. patent application Ser. No. 12/462,084, entitled METHOD AND SYSTEM FOR PROVIDING OBJECT INFORMATION ON THE INTERNET filed Jul. 29, 2009 which is incorporated herein by reference for all purposes, which claims priority to People's Republic of China Patent Application No. 200810147546.4 entitled METHOD AND SYSTEM FOR PROVIDING OBJECT INFORMATION ON THE INTERNET filed Aug. 28, 2008 which is incorporated herein by reference for all purposes.

FIELD OF THE INVENTION

The present application relates to computer network technology and in particular, to a method and a system for providing object information on the Internet.

BACKGROUND OF THE INVENTION

With the development of Internet, electronic commerce has become widely adopted. In ecommerce transactions, items of goods for sale (also referred to as commodities) are usually released and displayed in categories, so that it is convenient for a seller to release a commodity and for a buyer to search for a commodity. Existing techniques for storing and searching for commodities often require complex category structures to satisfy different viewing requirements. Adding a new way of browsing for information can be a burdensome operation that leads to increased storage load of database of the commodity transaction system.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

One way of managing commodities is illustrated below. Commodity information is stored in the same category data structure and is used when a seller releases a commodity via the back-end of a commodity transaction system and when a buyer searches for a commodity via the front-end of the commodity transaction system. The category structure is shown in Table 1:

TABLE 1

| Mobile Phone | Brand A | sa1, sa2, sa3 |
| | Brand B | sb1, sb2, sb3 |
| | Brand C | sc1, sc2 |
| Camera | Brand A | xa1, xa2, xa3 |
| | Brand B | xb1, xb2 |
| | Brand C | xc1, xc2 |

The $3^{rd}$ column of Table 1 represents index information of various commodities, which includes the brands and models of the commodities and is used to uniquely identify a commodity according to properties of the commodity, for example, sa1 is the index of a mobile phone with brand A, where sa represents the mobile phone with brand A and 1 represents the model of the mobile phone with brand A. In another example, xc in xc2 represents a camera with brand C and 2 in xc2 represents the model of the camera with brand C. According to the category system shown in Table 1, to browse mobile phones of brand A, a buyer needs to first select "mobile phone" and then select "Brand A". To browse both mobile phones and cameras of brand A, the buyer needs to select "mobile phone" and "Brand A" and then select "camera" and "Brand A" in turn according to Table 1. Thus, the operations of the buyer at this point are somewhat burdensome. Further, based on the categorization scheme of Table 1, a buyer cannot browse mobile phones according to their prices or browse cameras according to their pixel numbers. To solve this problem, category structures shown in Tables 2-4 are added:

TABLE 2

| Brand A | sa1, sa2, sa3, xa1, xa2, xa3 |
| Brand B | sb1, sb2, sb3, xb1, xb2 |
| Brand C | sc1, sc2, xc1, xc2 |

TABLE 3

| 1000 Yuan-2000 Yuan | sa1, sa2, sb1, sc1 |
| Over 2000 Yuan | sa3, sb2, sb3, sc2 |

TABLE 4

| 6 mega pixels-8 mega pixels | xa1, xa2, xb1, sc1 |
| Over 8 mega pixels | xa3, xb2, xc2 |

It can be seen that a type of category structure is set in each of Tables 2-4 and determines the commodities that belong to each category. A category may be set by storing identification information of the category. For example, two categories are set by storing identification information "6 mega pixels-8 mega pixels" and "Over 8 mega pixels". According to the category structures shown in Tables 2-4, the commodities may be browsed directly according to a brand, a price or a pixel number. The category structure shown in each of the above tables exists in both the front-end and back-end of the commodity transaction system. The structure of such a commodity transaction system is complex and the establishment of the category structures is bothersome. Moreover, in practice, a seller can release a commodity by using the category structure shown in Table 1 only; if using the category structures shown in Tables 2-4 to release the commodity, a seller needs to learn to master these category structures, even though the category structures shown in Tables 2-4 are unnecessary for the seller. On the other hand, buyers may browse the commodities in various schemes, in addition to those shown in Tables 1-4. In addition, the commodity transaction system may also push various category structures to the buyers according to various marketing schemes, for example, a category structure in which commodities are classified according to their sales volume.

Therefore, in the method disclosed above, relatively complex category structures are needed to be established in order to meet various browsing requirements, the operation to add a new browsing mode is cumbersome and the storage load of the database of the commodity transaction system is increased.

Figure 1:
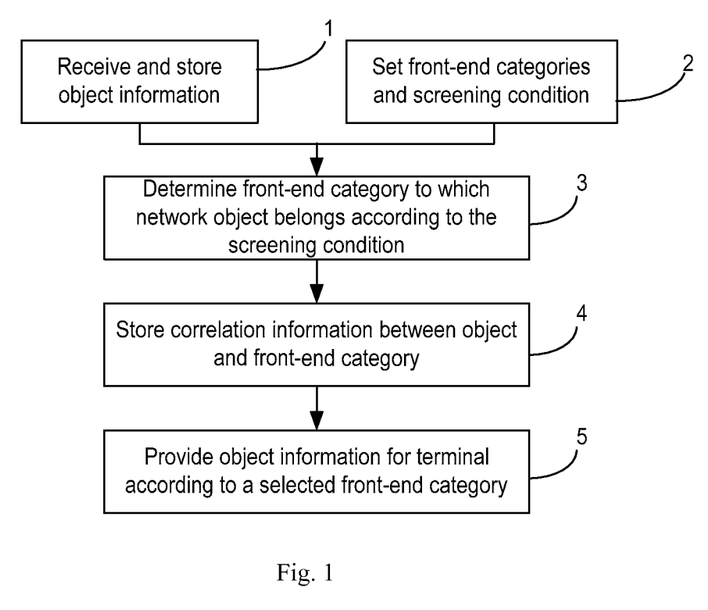
FIG. 1 is a flowchart illustrating an embodiment of a process for providing object information.

FIG. 1 is a flowchart illustrating an embodiment of a process for providing object information. In this example, the process is used to provide information of a network object for Internet users, in order to meet various requirements of browsing for the network object and avoiding the need for complex category structures.

At 1, the information of a network object is received and stored. In some embodiments, the information of the network object is from a user terminal such as a computing device (e.g., a computer or a mobile device) running a web browser. For example, in an embodiment of an Internet based commodity transaction system, a network object may correspond to a specific commodity released by a seller. The seller releases information pertaining to the commodity via the back-end of the commodity transaction system and the commodity transaction system stores the commodity information at the server side. As used herein, the back-end of the system refers to the part of the system that does not directly interact with the user.

At 2, front-end categories and screening conditions are configured. A front-end category system is used when the information of a network object is browsed via a user terminal. As used herein, the front-end of the system refers to the part of the system that directly interacts with the user. The front-end categories of the objects and the screening conditions corresponding to each of the front-end categories are preset at the server side, where the screening condition is used for selecting an object belonging to the corresponding front-end category according to the object information stored at the server side. As will be described more fully below, the screening conditions can be viewed as object properties (for example, brand of the product, price range of the product, etc.). Configuring front-end categories and screening conditions is independent of receiving and storing object information and may be carried out prior to or in parallel with receiving and storing object information. Detailed examples of front-end categories and screening conditions are described below.

At 3, the front-end category to which the received network object belongs according to the screening condition is determined. After a front-end category is determined, an object that belongs to the front-end category is selected based on the screening condition according to the object information stored at the server side. Similarly, when information of a network object uploaded by the terminal is received, the front-end category to which the object belongs is determined according to the screening condition.

At 4, the correlation information (i.e., relationship information) between the object and the front-end category is stored. The front-end category to which the network object belongs is determined in step 2 and the correlation between the network object and the front-end category is also determined. Here, the correlation information between the network object and the front-end category is stored for future use. One network object may belong to multiple front-end categories.

At 5, information of a network object is provided to a terminal according to the front-end category selected by the terminal. Because the correlation information between the network object and the front-end category has been stored, the information of the network object that belongs to the front-end category is provided for the terminal according to the correlation information after receiving the front-end category selection made by the terminal.

Commodities may be classified in various schemes. In some embodiments, the commodity transaction system receives and stores the commodity information provided by a seller via a user terminal. For example, the seller can input a text "a mobile phone of brand A, index sa1, with a price of 1250 Yuan" via a terminal and the commodity transaction system receives and stores the text. In another scheme, a back-end category system is constructed. A back-end category is set by employing a commodity classifying scheme, thereby setting up the category structure shown in Table 1. When a seller releases a commodity via a terminal, for example, when releasing a mobile phone sa3 with brand A, the seller selects "mobile phone" and "Brand A" in turn and sets the mobile phone sa3 in the category of "Brand A". According to the commodity classifying scheme, a commodity corresponds to only one category at each level. By establishing a back-end category and making a seller release a commodity according to the back-end category, the classification information of the commodity can be obtained accurately at the time the seller releases the commodity. For example, the usage classification of the commodity such as whether the commodity is a mobile phone or a camera can be obtained and the brand information of the commodity can also be obtained. After setting the mobile phone sa3 in the category "Brand A", the seller may input various information of the mobile phone sa3, such as the commodity classification of the mobile phone sa3, i.e., category "mobile phone", the brand and the model of the mobile phone sa3 and the price, configuration and performance parameters of the mobile phone such as the pixel count of the phone's camera. Such information is stored in the commodity transaction system. All the commodities are released via user terminals. For the purpose of example, the category structure shown in Table 1 is used to illustrate the category structure in a back-end category system, which involves all the commodities of the current commodity transaction system.

In order to facilitate the searching of a commodity by a buyer, various front-end categories are set in a front-end category system of the commodity transaction system. In other words, identification information of the front-end categories is stored. Referring to the above Tables 1-4, for example, in Table 2, three front-end categories including "commodity with brand A", "commodity with brand B" and "commodity with brand C" are set initially and the identification information of these three front-end categories is stored. Next, a screening condition corresponding to each of the front-end categories is set and then commodities belonging to each of the front-end categories are selected from the back-end category system according to the screening condition. For example, the screening condition "Brand A" is set for the front-end category "commodity with brand A" and the commodities are selected from the back-end category system shown in Table 1 according to the screening condition; particularly, commodities sa1, sa2, sa3, xa1, xa2 and xa3 meeting the screening condition are stored the front-end category "commodity with brand A" and are placed in the first row of Table 2. In another example, for the setting of the category structure shown in Table 3, after the front-end categories "1000 Yuan-2000 Yuan" and "Over 2000 Yuan" are set, the screening conditions "mobile phone of 1000 Yuan-2000 Yuan" and "mobile phone over 2000 Yuan" are set for these two front-end categories, respectively. Mobile phones with a price of 1000 Yuan-2000 Yuan and over 2000 Yuan are searched for in Table 1 according to these two screening conditions, respectively, and set in the categories "1000 Yuan-2000 Yuan" and "Over 2000 Yuan", respectively, thus obtaining the content in Table 3. In this example, in the front-end category system, the front-end categories and the corresponding screening conditions are set first and then a screening condition is used for determining the commodities belonging to the front-end category corresponding to the screening condition.

When it is determined that a certain commodity meets a screening condition, the correlation between the commodity and the front-end category corresponding to the screening condition is also determined. Thus, the correlation information between the commodity meeting the screening condition and the front-end category corresponding to the screening condition should be stored. For example, in the category structure shown in Table 3, the mobile phone sa1 has a price of 1250 Yuan and belongs to the front-end category "1000 Yuan-2000 Yuan". Thus, the information pertaining to "mobile phone sa1 belongs to the category '1000 Yuan-2000 Yuan'" should be recorded. In some embodiments, for simplicity, identification information of the category "1000 Yuan-2000 Yuan" is stored in the index of the mobile phone sa1. Assuming for example that the identification information of the category "1000 Yuan-2000 Yuan" represented using the term "12k", then "12k" is stored in the index of the mobile phone sa1 and "12k" stored in the index of the mobile phone sa1 is the correlation information between the mobile phone sa1 and the front-end category "1000 Yuan-2000 Yuan". In another example, the price of the mobile phone sb3 is 2300 Yuan and "20k" represents identification information of a category "Over 2000 Yuan". Thus, "20k", which is stored in the index of the mobile phone sb3, is the correlation information between the mobile phone sb3 and the front-end category "Over 2000 Yuan". Referring to the category structure shown in Table 4 as another example, if a camera xa2 has 6 mega pixels, the identification information "6w" representing a category "6 mega pixels-8 mega pixels" is stored in the index of the camera xa2. Similarly, if a camera xc2 has 10 mega pixels, the identification information "8w" representing a category of "over 8 mega pixels" is stored in the index of the camera xc2.

Figure 2:
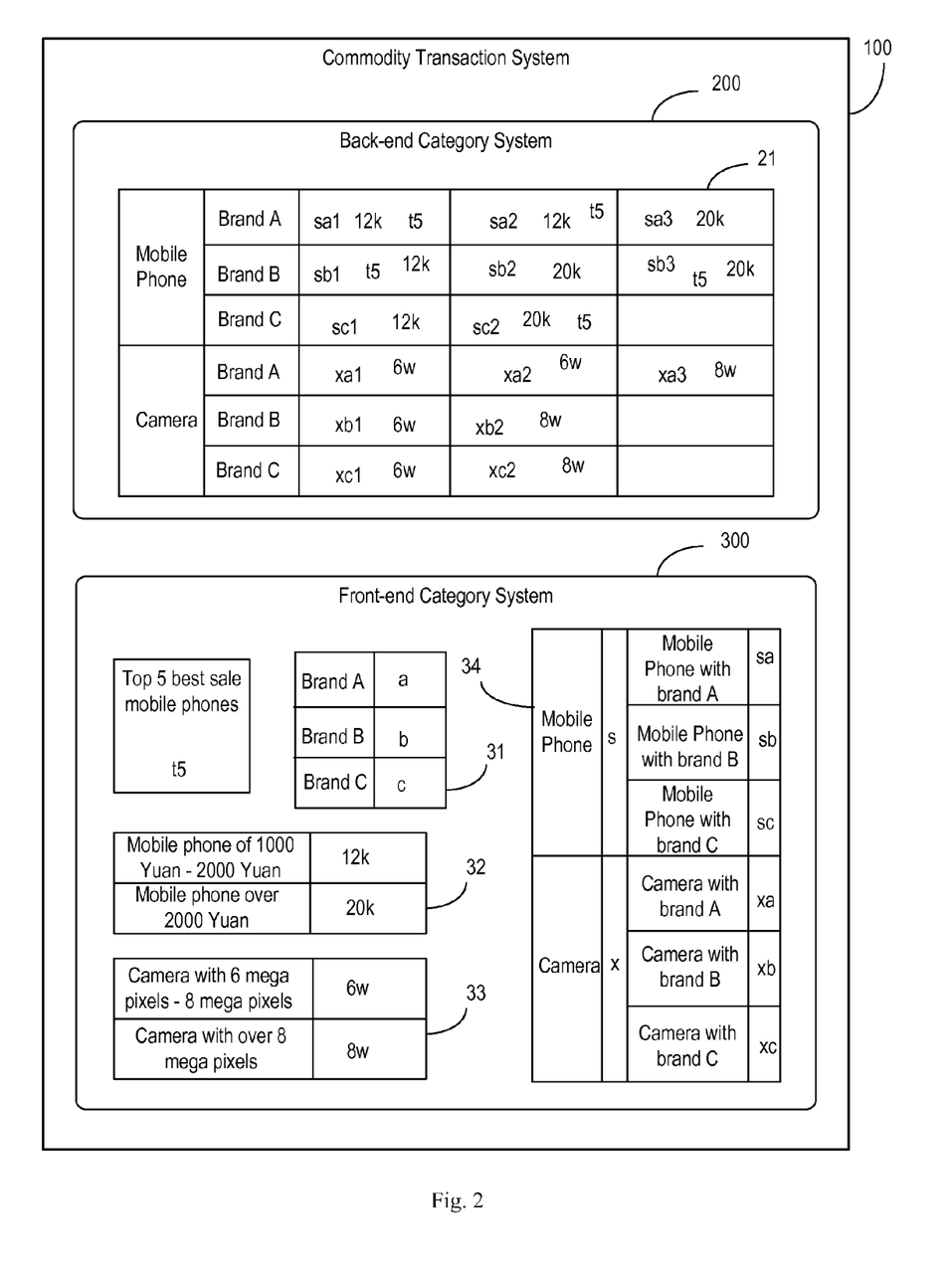
FIG. 2 is a data structure diagram illustrating an embodiment of a commodity transaction system.

FIG. 2 is a data structure diagram illustrating an embodiment of a commodity transaction system. In this example, a commodity transaction system 100 includes a back-end category system 200 and a front-end category system 300. Some category identification information in the category structure shown in Table 2, such as "Brand A", already exists in the commodity index and therefore needs not to be stored in the commodity index again. As shown in Tables 2-4, the contents of the first column include category names. The category name information does not have to be stored in the front-end category system, since the identification information of the category and the screening condition corresponding to the category can be stored instead. For example, in FIG. 2, on front-end category system 3, the category structure 32 includes the category identifier "12k" and the corresponding screening condition "mobile phone of 1000 Yuan-2000 Yuan" and the category structure 34 includes the category identifier "s" and the corresponding screening condition "mobile phone" and the category identifier "sa" and the corresponding screening condition "mobile phone with brand A". Each screening condition corresponds to a single front-end category.

In the example shown in FIG. 2, given that the front-end category system includes category structures 31-34, the category structure 21 in the back-end category system needs to be filled with corresponding information. In this example, back-end category system 200 selects a commodity classification scheme and employs a category structure 21. The selected commodity classification scheme may be based on the usage of the commodity since such a classification scheme is relatively constant, and it is convenient for a seller to be familiar with the back-end category system and to release a commodity based on usage classification. In hierarchical category structure 21, the corresponding commodity indexes are shown. The third, fourth and fifth columns in the category structure 21 represent the commodity indexes. Front-end category system 300 includes a category structure 34 that corresponds to back-end category structure 21, as well as other additional category structures. Identification information of a category and a corresponding screening condition of the category are stored in respective category structures of the front-end category system 300. For example, "mobile phones priced between 1000 Yuan-2000 Yuan" is a screening condition and 12k is the category identification information. The screening condition-category identification pair is stored in category structure 32. As additional examples, "Mobile phone" and "Brand A" are also screening conditions. "20k" in the category structure 32, "6w" in the category structure 33 and "a" in the category structure 31 are category identification information. Thus, the function of Tables 2-4 can be implemented by storing the screening condition and the corresponding front-end category identification information and storing the category identification information in the index of an object that meets the screening condition corresponding to the category identification information according to the screening condition. Less storage space is occupied than if the tables were duplicated in both the front-end and the back-end systems and the structure of the database is simple.

Additionally, the front-end category structure may also be hierarchical. For example, in the category structure 34, the identification information corresponding to the screening condition "mobile phone" is "s" and commodities meeting the screening condition "mobile phone" are further classified into three categories. The screening conditions corresponding to these three categories are "mobile phone with brand A", "mobile phone with brand B" and "mobile phone with brand C", with identification information being "sa", "sb" and "sc", respectively.

Some embodiments of the commodity transaction system provide the user terminal with an interface for selecting a category. For example, such an interface may include a hyperlink that is displayed on a web page and corresponds to a category identifier of the front-end category system and a search for commodities with an index containing the identifier may be made according to the category identifier. For example, after a hyperlink displayed as "digital product with brand A" is activated, the front-end category structure indicates that a category identifier "a" corresponds to the hyperlink of "digital product with brand A". Thus, back-end category structure 21 is searched according to the category identifier "a" and the information of any commodity with an index containing identifier "a" is displayed. At this point, a picture of the commodity may be displayed and the brand and model of the commodity may be shown in text under the picture, where the picture or text may be connected with a hyperlink, activation of which may cause display of detailed parameters of the commodity. In another example, the hyperlink "mobile phone" is activated. The corresponding front-end category system associated with the link is hierarchical front-end category structure 34 and the corresponding category identifier is "s". The back-end category structure 21 is then searched for any commodity with an index containing the category identifier "s". When the information of commodities found to match the category identifier "s" is displayed, the category names of the found commodities may be output first and provided with hyperlinks. For example, "mobile phone with brand A", "mobile phone with brand B" and "mobile phone with brand C" are output and displayed as hyperlinks. When one of the hyperlinks such as "mobile phone with brand A" is activated, the corresponding category identifier "sa" is used to iteratively search category structure 21 for any commodity with an index containing the category identifier "sa".

Setting various front-end categories provides various commodity selection schemes for a buyer. In a transaction, a buyer may review a commodity according to different perspectives or selection criteria. For example, the buyer may review a commodity from the perspective of a brand or price, that is, the commodity is selected according to the brand or the price. The specific review perspective and scale may vary with the actual requirements. Therefore, in some embodiments, the categories and screening conditions in the front-end category system can be altered to suit buyers' review requirements on the commodities. For example, the commodity transaction system may further modify or cancel any category and screening condition in the front-end category system 300. For example, if buyers are no longer interested in the screen condition of "6 mega pixels-8 mega pixels", the category shown in the first row of the category structure 33 may be cancelled; that is, the stored screening condition "6 mega pixels-8 mega pixels" and "6w" may be deleted. When all the categories in a category structure are cancelled, the category structure is also cancelled. Further, the screening condition in the category structure may also be modified. For example, the screening condition "mobile phone of 1000 Yuan-2000 Yuan" in the category structure 32 may be modified as "mobile phone of 800 Yuan-1500 Yuan" instead, if the buyers exhibit a greater interest in such a screening condition. The above cancellation of categories and update of screening conditions can accommodate to a change of commodity transaction environment, so that the categories provided by the front-end may be more adaptive to the actual requirements. To meet new requirements of commodity buyers, or to push a certain category of commodities to buyers, a category and its corresponding screening condition may be set and front-end category identification information corresponding to the commodities may be stored in an index storage unit of the commodities, thus implementing the flexible management and display of commodity information. For example, referring to FIG. 2, to push a category of "Top 5 mobile phones" to buyers, top 5 best selling mobile phones are determined according to the statistically obtained commodity sales volume and the identification information "t5" of the front-end category, which corresponds to a screening condition "top 5 best selling mobile phones", is added to the indexes of these mobile phones in the back-end category system 200. The corresponding statistical sales volume data is required for searching the back-end for the commodities according to this screening condition. Mobile phones "sa1", "sa2", "sb1", "sb3" and "sc2" are found and the results are displayed to the user.

In some embodiments of the invention, the method according to the invention is described illustratively in an application to commodity management. The method is not just limited to the application to commodity management and may also be applied to the management of other network objects, for example, the management of data of human resources and the management of data of various news.

Figure 3:
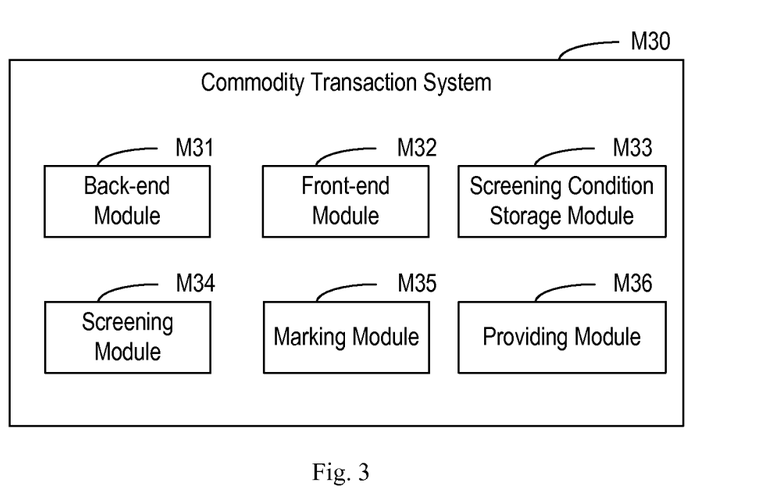
FIG. 3 is a block diagram illustrating an embodiment of an Internet-based object information system device for managing commodity transactions.

FIG. 3 is a block diagram illustrating an embodiment of an Internet-based object information system device for managing commodity transactions. The commodity transaction system M30 includes a back-end module M31, a front-end module M32, a screening condition storage module M33, a screening module M34, a marking module M35 and a providing module M36. The modules described above can be implemented as software components executed on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as CD-ROM, U disk, mobile hard disk, etc.), including a number of instructions for making one or more computing devices (such as personal computers, servers, network equipments, etc.) implement the methods described in the embodiments of the present invention. The modules may be implemented on a single device or distributed across multiple devices. The functions of the modules may be merged into one another or further split into multiple sub-modules.

The back-end module M31 is configured to receive and store information of an object provided by a terminal. The front-end module M32 is configured to store identification information of a front-end category. After the identification information is stored, a front-end category system is established. The screening condition storage module M33 is configured to store a screening condition that corresponds to the front-end category uniquely. The screening module M34 is configured to determine whether the object provided by the terminal meets the screening condition. The marking module M35 is configured to store the correlation information between the object and the front-end category corresponding to the screening condition if the object meets the screening condition, for example, the marking module M35 stores the identification information of the front-end category into an index of the object. Based on the front-end category selected by a terminal and the correlation information stored by the marking module M35, the providing module M36 provides the terminal with the information of an object correlated with the front-end category.

Once a back-end category system is established, the back-end module M31 includes a classification submodule and an information storage submodule. The classification submodule generates the identification information of a back-end category according to a classification scheme of the object and sends the identification information to the information storage module. The generation of the identification information of the back-end category means the establishment of the back-end category. The classification scheme of the object may be set by a system administrator. According to the classification scheme used by the classification submodule to generate the identification information of the back-end category, the information storage module correspondingly stores the identification information of each back-end category and the information of the object provided by the terminal. That is, the object is placed in the back-end category according to the classification scheme.

When storing the object information, the information storage module may store the information of each object and the identification information of the back-end category corresponding to the object into a storage submodule. The marking module M35 may include several marking submodules, each of which corresponds to one object and stores the identification information of the front-end category (for example, "12k", "t5", etc. in the back-end category structure 21 in FIG. 2) and the object corresponding to the marking submodule meets the screening condition corresponding to the front-end category.

An example of the providing module M36 includes a searching submodule and an outputting module. According to the identification information of the front-end category selected by the terminal, the searching submodule determines the storage submodule in which the identification information of the front-end category is stored. The outputting module is configured to provide the terminal with the information of the object in the storage submodule determined by the searching submodule.

Additionally, in order to enable modifying of the screening condition, the screening condition storage module M33 may also receive a screening condition from a terminal and delete the original screening condition. Moreover, the front-end module M32 may also delete the stored identification information of a front-end category according to an instruction received. Thus, the front-end category system may be modified flexibly.

Using the back-end category system to release a commodity in the case of a commodity transaction on the Internet has been described. The back-end category system is maintained as steady as possible, so that the seller may be familiar with the commodity classification of the system and be able to release the commodity with high efficiency. On the other hand, a buyer may select a commodity from various perspectives and therefore require different flexible classification schemes of commodities. Categories may be added, deleted and/or modified in the front-end category system employed by the buyer while browsing for commodities. A correlation between the front-end category and the back-end commodity is maintained. When the buyer searches for a commodity via the front-end system, the commodities in the back-end system can be determined via the correlation according to the category selection made by the buyer, so that information of the commodity stored in the back-end can be provided for the buyer. The techniques described may be applied to the network-based commodity transaction, as well as to other network objects, for example, to the management of data of human resources and the management of news distribution. The distributor and browser of object information use different category systems to meet their respective requirements. Flexible object classification can be provided for the browser of the network object information while a stable category system is provided for the distributor of the network object, thus fulfilling the requirements that the front-end requires the category system to be flexible and the back-end requires the category system to be relatively stable. Moreover, only screening condition information and category identification information, which usually require small storage space, need to be stored for the front-end category system and only one category structure is needed by the back-end category system, thus the storage load of the database of the object information management system can be lowered and the structure of the object information management system can be simplified, which is adaptive to the management on the ever increasing number of network objects.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
  configure a plurality of front-end categories to be displayed at a user interface;
  configure a plurality of screening conditions corresponding to respective ones of the plurality of front-end categories, wherein a screening condition included in the plurality of screening conditions that corresponds to a front-end category included in the plurality of front-end categories describes a property of one or more network objects that match the front-end category;
  store a screening condition-category identification pair corresponding to the front-end category at a front-end category structure, wherein the screening condition-category identification pair corresponding to the front-end category comprises the screening condition corresponding to the front-end category and a category identifying information associated with the front-end category;
  receive input object information pertaining to a network object;
  configure a first back-end category associated with data stored at a server;
  store the input object information pertaining to the network object in the first back-end category associated with the data stored at the server;
  determine that the network object matches the front-end category by determining that the input object information pertaining to the network object stored in the first back-end category associated with the data stored at the server meets the screening condition corresponding to the front-end category included in the screening condition-category identification pair corresponding to the front-end category;

in response to the determination that the network object matches the front-end category, store the category identifying information associated with the front-end category included in the screening condition-category identification pair corresponding to the front-end category with the network object in the first back-end category at the server;

display at least a portion of the plurality of front-end categories at the user interface;

receive a selection to a displayed front-end category;

in response to the selection to the displayed front-end category, identify a correlating object stored in a second back-end category associated with the data stored at the server based at least in part on a category identifying information associated with the displayed front-end category; and output object information pertaining to the identified correlating object at the user interface; and one or more memories coupled to the one or more processors and configured to provide instructions to the one or more processors.

2. The system of claim 1, wherein to configure the first back-end category associated with the data stored at the server comprises to configure the first back-end category according to a classification scheme used to store data at the server.

3. The system of claim 2, wherein the classification scheme comprises a commodity classification scheme configured for storing commodity information at the server.

4. The system of claim 1, wherein the screening condition corresponding to the front-end category comprises one or more of the following: a brand and a price range.

5. The system of claim 1, wherein to display the at least portion of the plurality of front-end categories at the user interface comprises to display category identifiers corresponding to respective ones of the at least portion of the plurality of front-end categories at the user interface.

6. The system of claim 1, wherein the one or more processors are further configured to:

receive an instruction to modify the screening condition corresponding to the front-end category; and modify the screening condition based at least in part on the instruction.

7. The system of claim 1, wherein the one or more processors are further configured to:

receive an instruction to cancel the front-end category; and cancel the front-end category based at least in part on the instruction.

8. The system of claim 1, wherein to store the category identifying information associated with the front-end category with the network object at the server comprises to store the category identifying information associated with the front-end category included in the screening condition-category identification pair corresponding to the front-end category in an index associated with the network object in the first back-end category at the server.

9. A method, comprising:

configuring a plurality of front-end categories to be displayed at a user interface;

configuring a plurality of screening conditions corresponding to respective ones of the plurality of front-end categories, wherein a screening condition included in the plurality of screening conditions that corresponds to a front-end category included in the plurality of front-end categories describes a property of one or more network objects that match the front-end category;

storing a screening condition-category identification pair corresponding to the front-end category at a front-end category structure, wherein the screening condition-category identification pair corresponding to the front-end category comprises the screening condition corresponding to the front-end category and a category identifying information associated with the front-end category;

receiving input object information pertaining to a network object;

configuring a first back-end category associated with data stored at a server;

storing, using one or more processors, the input object information pertaining to the network object in the first back-end category associated with the data stored at the server;

determining that the network object matches the front-end category by determining that the input object information pertaining to the network object stored in the first back-end category associated with the data stored at the server meets the screening condition corresponding to the front-end category included in the screening condition-category identification pair corresponding to the front-end category;

in response to the determination that the network object matches the front-end category, storing the category identifying information associated with the front-end category included in the screening condition-category identification pair corresponding to the front-end category with the network object in the first back-end category at the server;

displaying at least a portion of the plurality of front-end categories at the user interface;

receiving a selection to a displayed front-end category;

in response to the selection to the displayed front-end category, identifying a correlating object stored in a second back-end category associated with the data stored at the server based at least in part on a category identifying information associated with the displayed front-end category; and outputting object information pertaining to the identified correlating object at the user interface.

10. The method of claim 9, wherein configuring the first back-end category associated with the data stored at the server comprises configuring the first back-end category according to a classification scheme used to store data at the server.

11. The method of claim 10, wherein the classification scheme comprises a commodity classification scheme configured for storing commodity information at the server.

12. The method of claim 9, wherein the screening condition corresponding to the front-end category comprises one or more of the following: a brand and a price range.

13. The method of claim 9, wherein displaying the at least portion of the plurality of front-end categories at the user interface comprises displaying category identifiers corresponding to respective ones of the at least portion of the plurality of front-end categories at the user interface.

14. The method of claim 9, further comprising:

receiving an instruction to modify the screening condition corresponding to the front-end category; and modifying the screening condition based at least in part on the instruction.

15. The method of claim 9, further comprising:

receiving an instruction to cancel the front-end category; and canceling the front-end category based at least in part on the instruction.

16. The method of claim 9, wherein storing the category identifying information associated with the front-end category with the network object at the server comprises storing the category identifying information associated with the front-end category included in the screening condition-category identification pair corresponding to the front-end category in an index associated with the network object in the first back-end category at the server.

17. A computer program product, the computer program product comprising a non-transitory computer readable storage medium and comprising computer instructions for:

configuring a plurality of front-end categories to be displayed at a user interface;

configuring a plurality of screening conditions corresponding to respective ones of the plurality of front-end categories, wherein a screening condition included in the plurality of screening conditions that corresponds to a front-end category included in front-end categories describes a property of one or more network objects that match the front-end category;

storing a screening condition-category identification pair corresponding to the front-end category at a front-end category structure, wherein the screening condition-category identification pair corresponding to the front-end category comprises the screening condition corresponding to the front-end category and a category identifying information associated with the front-end category;

receiving input object information pertaining to a network object;

configuring a first back-end category associated with data stored at a server;

storing the input object information pertaining to the network object in the first back-end category associated with the data stored at the server;

determining that the network object matches the front-end category by determining that the input object information pertaining to the network object stored in the first back-end category associated with the data stored at the server meets the screening condition corresponding to the front-end category included in the screening condition-category identification pair corresponding to the front-end category;

in response to the determination that the network object matches the front-end category, storing the category identifying information associated with the front-end category included in the screening condition-category identification pair corresponding to the front-end category with the network object in the first back-end category at the server;

displaying at least a portion of the plurality of front-end categories at the user interface;

receiving a selection to a displayed front-end category;

in response to the selection to the displayed front-end category, identifying a correlating object stored in a second back-end category associated with the data stored at the server based at least in part on a category identifying information associated with the displayed front-end category; and outputting object information pertaining to the identified correlating object at the user interface.

\* \* \* \* \*